(12) United States Patent
Masuda

(10) Patent No.: US 8,556,432 B2
(45) Date of Patent: Oct. 15, 2013

(54) LIGHT SOURCE UNIT AND PROJECTOR

(75) Inventor: Hiroki Masuda, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 265 days.

(21) Appl. No.: 13/194,143

(22) Filed: Jul. 29, 2011

(65) Prior Publication Data

US 2012/0026472 A1   Feb. 2, 2012

(30) Foreign Application Priority Data

Jul. 30, 2010   (JP) ................................. 2010-172644

(51) Int. Cl.
*G03B 21/00* (2006.01)
*G03B 21/14* (2006.01)
*G03B 21/20* (2006.01)
*G03B 21/26* (2006.01)

(52) U.S. Cl.
USPC .................... 353/31; 353/84; 353/85; 353/94

(58) Field of Classification Search
USPC ............. 353/20, 30–31, 84–85, 94, 121–122; 359/885, 889, 891–892, 721–723, 884, 359/890; 315/360; 348/743
See application file for complete search history.

(56) References Cited

U.S. PATENT DOCUMENTS

| | | | | |
|---|---|---|---|---|
| 8,002,413 B2* | 8/2011 | Narikawa | ........................ | 353/37 |
| 8,157,398 B2* | 4/2012 | Yamamoto | ...................... | 362/84 |
| 8,167,440 B2* | 5/2012 | Sato et al. | ........................ | 353/99 |
| 8,231,227 B2* | 7/2012 | Kurosaki | ......................... | 353/31 |
| 8,272,745 B2* | 9/2012 | Shibasaki | ........................ | 353/31 |
| 8,308,306 B2* | 11/2012 | Miyazaki et al. | ............... | 353/84 |
| 8,310,144 B2* | 11/2012 | Hoelen et al. | .................. | 313/502 |
| 8,342,697 B2* | 1/2013 | Iwanaga | .......................... | 353/94 |
| 8,348,432 B2* | 1/2013 | Miyazaki | ........................ | 353/31 |
| 8,354,790 B2* | 1/2013 | Iwanaga | ......................... | 313/506 |
| 8,434,875 B2* | 5/2013 | Masuda | .......................... | 353/85 |
| 8,444,273 B2* | 5/2013 | Shibasaki | ........................ | 353/31 |
| 2005/0253492 A1* | 11/2005 | Besshi et al. | .................. | 313/110 |
| 2009/0262308 A1* | 10/2009 | Ogawa | ............................ | 353/31 |
| 2009/0284148 A1* | 11/2009 | Iwanaga | ........................ | 313/506 |
| 2010/0149496 A1* | 6/2010 | Inoue | .............................. | 353/98 |

(Continued)

FOREIGN PATENT DOCUMENTS

JP   2004-341105 A   12/2004

*Primary Examiner* — Tony Ko
*Assistant Examiner* — Jori S Reilly-Diakun
(74) *Attorney, Agent, or Firm* — Holtz, Holtz, Goodman & Chick, PC

(57) ABSTRACT

There is provided a light source unit comprising a luminescent plate having a luminescent light emission portion and a diffuse transmission portion, a first light source which emits light of a wavelength band which can excite the luminescent material, a second light source which emits light of a wavelength band which differs from the luminous light and the light emitted from the first light source, a light guiding optical system which guides light of respective wavelength bands in color emitted from the luminescent plate to a predetermined plane, and a light source control part for controlling individually the emission of light from the first light source and the second light source, wherein the luminescent plate is disposed on optical paths of the first light source and the second light source, wherein a light shining position of light from the first light source and a light shining position of light from the second light source are made to differ from each other on the luminescent plate, and wherein the light source control part controls so that the first light source and the second light source emit light simultaneously or separately to thereby emit synthesized light or monochromatic light.

10 Claims, 13 Drawing Sheets

(56) References Cited

U.S. PATENT DOCUMENTS

| | | | |
|---|---|---|---|
| 2010/0245777 A1* | 9/2010 | Ogura | 353/38 |
| 2010/0328617 A1* | 12/2010 | Masuda | 353/31 |
| 2010/0328625 A1* | 12/2010 | Miyazaki et al. | 353/85 |
| 2010/0328627 A1* | 12/2010 | Miyazaki | 353/85 |
| 2010/0328628 A1* | 12/2010 | Masuda | 353/85 |
| 2010/0328632 A1* | 12/2010 | Kurosaki et al. | 353/98 |
| 2011/0043764 A1* | 2/2011 | Narikawa | 353/31 |
| 2011/0051102 A1* | 3/2011 | Ogura et al. | 353/85 |
| 2011/0075103 A1* | 3/2011 | Ogawa et al. | 353/31 |
| 2011/0096296 A1* | 4/2011 | Ogawa | 353/31 |
| 2011/0096297 A1* | 4/2011 | Ogino et al. | 353/31 |
| 2011/0096300 A1* | 4/2011 | Shibasaki | 353/85 |
| 2011/0234998 A1* | 9/2011 | Kurosaki | 353/85 |
| 2011/0242497 A1* | 10/2011 | Fukano | 353/31 |
| 2011/0304831 A1* | 12/2011 | Yoshigai | 353/85 |
| 2011/0317131 A1* | 12/2011 | Miyazaki | 353/31 |
| 2012/0026472 A1* | 2/2012 | Masuda | 353/85 |
| 2012/0062857 A1* | 3/2012 | Saitou et al. | 353/98 |
| 2012/0075591 A1* | 3/2012 | Ogura et al. | 353/31 |
| 2012/0140185 A1* | 6/2012 | Masuda | 353/31 |
| 2012/0147331 A1* | 6/2012 | Miyazaki | 353/31 |
| 2012/0229780 A1* | 9/2012 | Sato | 353/85 |
| 2012/0262677 A1* | 10/2012 | Ogino et al. | 353/31 |
| 2013/0021587 A1* | 1/2013 | Miyazaki et al. | 353/85 |
| 2013/0083297 A1* | 4/2013 | Miyazaki | 353/31 |

* cited by examiner

FIG. 7

| WHEEL DEGREE [°] | 0 | 45 | 90 | 135 | 180 | 225 | 270 | 315 | 360(0) |
|---|---|---|---|---|---|---|---|---|---|
| EMITTED LIGHT | | G | Y | R | | G | | B | |
| LIGHT EMITTING CONTROL OF FIRST LIGHT SOURCE (B) | ON / OFF | | | | | | | | |
| LIGHT EMITTING CONTROL OF SECOND LIGHT SOURCE (R) | ON / OFF | | | | | | | | |
| LIGHT SHINING POSITION OF FIRST LIGHT SOURCE | 1 | | 2 | | 3 | | 4 | | |
| LIGHT SHINING POSITION OF SECOND LIGHT SOURCE | 3 | | 4 | | 1 | | 2 | | |

FIG. 9

| WHEEL DEGREE [°] | 0 | 45 | 90 | 135 | 180 | 225 | 270 | 315 | 360(0) |
|---|---|---|---|---|---|---|---|---|---|
| EMITTED LIGHT | | G | | R | | G | | B | |
| LIGHT EMITTING CONTROL OF FIRST LIGHT SOURCE (B) | ON/OFF | | | | | | | | |
| LIGHT EMITTING CONTROL OF SECOND LIGHT SOURCE (R) | ON/OFF | | | | | | | | |
| LIGHT SHINING POSITION OF FIRST LIGHT SOURCE | | 1 | | 2 | | 3 | | 4 | |
| LIGHT SHINING POSITION OF SECOND LIGHT SOURCE | | 3 | | 4 | | 1 | | 2 | |

FIG. 11

| WHEEL DEGREE [°] | 0 | 45 | 90 | 135 | 180 | 225 | 270 | 315 | 360(0) |
|---|---|---|---|---|---|---|---|---|---|
| EMITTED LIGHT | | G | | R | | G | | M | B |
| LIGHT EMITTING CONTROL OF FIRST LIGHT SOURCE (B) | ON / OFF | | | | | | | | |
| LIGHT EMITTING CONTROL OF SECOND LIGHT SOURCE (R) | ON / OFF | | | | | | | | |
| LIGHT SHINING POSITION OF FIRST LIGHT SOURCE | | 1 | | 2 | | 3 | | 4 | |
| LIGHT SHINING POSITION OF SECOND LIGHT SOURCE | | 3 | | 4 | | 1 | | 2 | |

FIG. 13

LIGHT SOURCE UNIT AND PROJECTOR

CROSS-REFERENCE TO RELATED APPLICATIONS

This application is based upon and claims the benefit of priority of Japanese Patent Application No. 2010-172644 filed on Jul. 30, 2010, the entire contents of which are to be incorporated herein by reference.

BACKGROUND OF THE INVENTION

1. Field of the Invention

The present invention relates to a light source unit and a projector which includes the light source unit.

2. Description of the Related Art

In these days, data projectors are used on many occasions as image projection apparatuses which project images including images of screens and video images of personal computers, as well as images based on image data which is stored in memory cards on to a screen. These projectors are such that light emitted from a light source is collected to a display device such as a DMD (Digital Micromirror Device) and a liquid crystal plate for display of a color image onto the screen.

Conventionally, in the mainstream of these projectors, high-intensity discharge lamps are used as light sources. However, in recent years, there have been made many developments and proposals on projectors which use, as a light source, alight emitting diode (LED) or a laser diode, or a device utilizing the organic EL technology or light emission technique using a luminescent material. For example, JP-A-2004-341105 proposes a light source unit having a solid light source as an excitation light source and a luminescent wheel which is made up of a disk-shaped transparent base on which a luminescent material layer is disposed which receives as excitation light ultraviolet light which is emitted from the solid light source and converts it into visible light.

In the light source unit proposed by JP-A-2004-341105, ultraviolet light as excitation light is shone on to the luminescent material layer formed on a surface of the luminescent wheel, and luminescent light of red, green and blue wavelength bands can be emitted from the luminescent wheel. However, the luminous efficiency of the red luminescent material is lower than those of the other luminescent materials, and therefore, in the event that the luminescent material layers are disposed substantially equally in area in the circumferential direction of the luminescent wheel, there is caused a problem that the luminance of red becomes insufficient.

SUMMARY OF THE INVENTION

The invention has been made in view of the problem inherent in the related art, and an object thereof is to provide a light source unit which can increase the luminance of a screen by comprising a light source which excites a luminescent material, a luminescent plate which has a luminescent material having a good luminous efficiency and a monochromatic light source which emits light of a wavelength band which corresponds to a luminescent material which has a relatively low luminous efficiency, and a projector which comprises this light source unit.

The light source unit of the invention is a light source unit which emits light of a plurality of wavelength bands in color, comprising a luminescent plate having a luminescent light emission portion on which is formed a layer of a luminescent material which receives excitation light to emit luminous light and a diffuse transmission portion which transmits light in a diffusing fashion, a first light source which emits light of a wavelength band which can excite the luminescent material, a second light source which emits light of a wavelength band which differs from the luminous light emitted from the luminescent material and the light emitted from the first light source, a light guiding optical system which guides light of respective wavelength bands in color emitted from the luminescent plate to a predetermined plane, and a light source control part for controlling individually the emission of light from the first light source and the second light source, wherein the luminescent plate is disposed on optical paths of the first light source and the second light source, and wherein a light shining position of light from the first light source and a light shining position of light from the second light source are made to differ from each other on the luminescent plate.

In addition, a project of the invention comprises the light source unit, a display device, a light source side optical system which collects light from the light source unit to the display device, a projection side optical system which projects an image projected from the display device on to a screen and a projector control unit which controls the light source unit and the display device.

According to the invention, there can be provided the light source unit which can increase the luminance of the screen by comprising the light source which excites the luminescent material, the luminescent plate which has the luminescent material having the good luminous efficiency and the monochromatic light source which emits the light of wavelength band which corresponds to the luminescent material having the relatively low luminous efficiency, and the projector which comprises the light source unit.

In addition, the luminescent light emission portion and the diffuse transmission portion are formed on the luminescent plate of the light source unit, and the light of the plurality of wavelength bands in color can be emitted from the light source unit by causing the excitation light from the first light source unit and the monochromatic light from the second light source to be shone on to the luminescent plate. Thus, the light source unit with the simple configuration and the small projector which comprises the light source unit can be provided.

BRIEF DESCRIPTION OF THE DRAWINGS

The invention will be understood much sufficiently by reading the following detailed description thereof and referring to accompanying drawings. However, the detailed description and the accompanying drawings are intended mainly to describe the invention and are not intended to limit the scope thereof. In the accompanying drawings;

FIG. 7 is a timing chart showing timings at which a first light source and a second light source are turned on and off by a light source control part according to the embodiment of the invention, FIG. 9 is a timing chart showing timings at which the first light source and the second light source are turned on and off by the light source control part in the light source unit including the luminescent wheel, FIG. 11 is a timing chart showing timings at which the first light source and the second light source are turned on and off by the light source control part according to the modified example of the invention, FIG. 13 is a timing chart showing timings at which the light first source and the second light source are turned on and off by the light source control part according to the different modified example of the invention.

DETAILED DESCRIPTION OF THE PREFERRED EMBODIMENT

Figure 1:
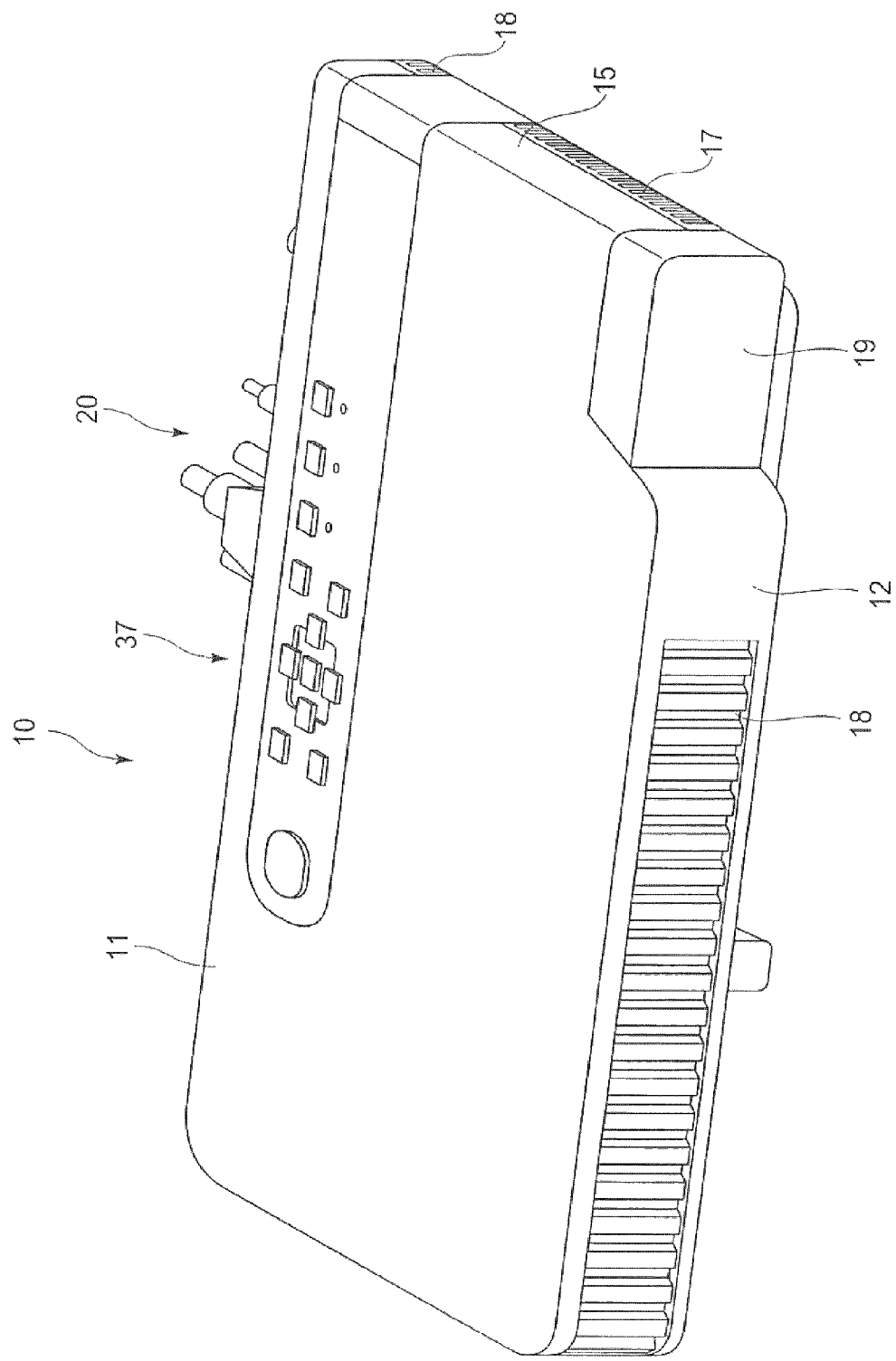
FIG. 1 is an external perspective view showing a projector according to an embodiment of the invention.

Hereinafter, a preferred mode for carrying out the invention will be described by use of the accompanying drawings. Although various limitations which are technically preferable in carrying out the invention are imposed on an embodiment which will be described below, the scope of the invention is not limited in any way by the following embodiment and illustrated examples.

Hereinafter, a mode for carrying out the embodiment will be described. A projector 10 includes a light source unit 60, a display device 51, a light source side optical system 170 which collects light from the light source unit 60 to the display device 51, a projection side optical system 220 which projects an image emitted from the display device 51 on to a screen, and a projector control unit which controls the light source unit 60 and the display device 51. This projector control unit includes a light source control part which controls individually a first light source 71 and a second light source 121 of the light source unit 60.

In addition, the light source unit 60 includes a blue light source device 70, a luminescent light emitting device 100, a red light source device 120, and a light guiding optical system 140. The blue light source device 70 has a plurality of first light sources 71 which are laser emitters which emit light of blue wavelength band. The red light source device 120 has a plurality of second light sources 121 which are laser emitters which emit light of red wavelength band.

The luminescent light emitting device 100 includes a luminescent wheel 101 which is made up of a disk-shaped base and a wheel motor 110 which drives to rotate the luminescent wheel 101. The luminescent wheel 101 has a diffuse transmission portion 104 which transmits light emitted from the first light sources 71 or the second light sources 121 in a diffusing fashion and a luminescent light emitting portion 103 on which is formed a layer of a green luminescent material which receives light emitted from the first light sources 71 as excitation light to emit a luminescent light of green wavelength band. A reflection surface which reflects light is formed on the luminescent light emitting portion 103, and the layer of the luminescent material which receives excitation light to emit luminescent light is formed on the reflection surface.

The luminescent wheel 101 is disposed on optical paths of the first light sources 71 and the second light sources 121. Further, the first light sources 71, the second light sources 121 and the luminescent wheel 101 are disposed so that a light shining position of light from the first light sources 71 on the luminescent wheel 101 and a light shining position of light from the second light sources 121 on the luminescent wheel 101 are point symmetrical with respect to a rotational axis of the luminescent wheel 101. Namely, the light source unit 60 is configured so that the light shining position of light from the first light sources 71 and the light shining position of light from the second light sources 121 differ from each other on the luminescent wheel 101.

The first light sources 71 can shine laser beams of blue wavelength band sequentially on to the diffuse transmission portion 104 and the luminescent light emitting portion 103 of the luminescent wheel 101 which is rotating. The second light sources 121 can shine laser beams of red wavelength band on to the diffuse transmission portion 104 of the luminescent wheel 101 which is rotating.

Consequently, when laser beams of blue wavelength band are shone on to the diffuse transmission portion 104 of the rotating luminescent wheel 101, light of blue wavelength band is transmitted in a diffusing fashion, and when laser beams of blue wavelength band are shone on to the luminescent light emitting portion 103, luminescent light of green wavelength band is emitted from the green luminescent material. In addition, when laser beams of red wavelength band are shone on to the diffuse transmission portion 104 of the rotating luminescent wheel 101, light of red wavelength band is transmitted in a diffusing fashion.

Namely, this luminescent wheel 101 functions as a luminescent plate in the following manner. When laser beams are shone on to the rotating luminescent wheel 101 from the first light sources 71 or the second light sources 121, the laser beams of blue wavelength band from the first light sources 71 are received at the luminescent light emitting portion 103 as excitation light, whereby luminescent light of green wavelength band is emitted. In addition, when the laser beams of blue wavelength band from the first light sources 71 are received at the diffuse transmission portion 104, the blue light is emitted in a diffusing fashion. Further, when the laser beams of red wavelength band from the second light sources 121 are received at the diffuse transmission portion 104, the red light is emitted in a diffusing fashion.

In addition, the light guiding optical system 140 includes lenses, mirrors and so on which collect light of red, green and blue wavelength band which is emitted from the luminescent light emitting device 100 to an entrance port of a light tunnel 175 which is a predetermined plane. Namely, light of red, green and blue wavelength band which is emitted from the luminescent wheel 101 is guided to the entrance port of the light tunnel 175 by the light guiding optical system 140.

The red, green and blue light guided to the light tunnel 175 is collected to the display device 51 by the light source side optical system 170 within an optical system unit 160 and is projected on to the screen by the projection side optical system 220.

Namely, when the light source control part in the projector control unit controls the first light sources 71 and the second light sources 121 so as to emit light separately, the light source unit 60 can sequentially emit monochromatic light of red, green and blue wavelength bands within one frame. Then, the DMD, which is the display device 51 of the projector 10, time-shares to display light of the respective colors in accordance with data, where color images can be produced on the screen.

In addition, the light source control part controls the first light sources 71 and the second light sources 121 so as to emit light simultaneously so that green light emitted from the luminescent light emitting portion 103 when it receives light from the first light sources 71 and red light which is emitted from the second light sources 121 and which passes through the diffuse transmission portion 104 in a diffusing fashion are synthesized by a predetermined period of time.

Further, the light source control part controls the first light sources 71 and the second light sources 121 so as to emit light simultaneously so that blue light which is emitted from the first light sources 71 and which passes through the diffuse transmission portion 104 in a diffusing fashion and red light which is emitted from the second light sources 121 and which passes through the diffuse transmission portion 104 in a diffusing fashion are synthesized by a predetermined period of time.

Namely, the light source unit 60 is controlled so as to include not only the period of time when light of wavelength bands of red, green and blue, which are the primary three colors of light, are emitted separately within one frame but also the period of time when the synthesized light is emitted to thereby emit light of wavelength bands of the three primary colors of light but also light of wavelength bands of yellow and magenta, which are complementary colors.

<Embodiment>

Hereinafter, an embodiment of the invention will be described in detail by reference to the accompanying drawings. FIG. 1 is a perspective view showing an external appearance of a projector 10. In this embodiment, left and right with respect to the projector 10 denote, respectively, left and right directions with respect to a projecting direction, and front and rear denote, respectively, front and rear directions with respect to a direction towards a screen and a traveling direction of a pencil of light.

As is shown in FIG. 1, the projector 10 has a substantially rectangular parallelepiped shape and has a lens cover 19 which covers a projection port which is laid to a side of a front panel 12 which is referred to as a front side panel of a projector housing, as well as a plurality of outside air inlet holes 18 in the front panel 12. Further, although not shown, the projector 10 includes an Ir reception unit for receiving a control signal from a remote controller.

In addition, a keys/indicators unit 37 is provided on an upper side panel 11 of the housing. Disposed on this keys/indicators unit 37 are keys and indicators which include a power supply switch key, a power indicator which informs whether the power supply is on or off, a projection switch key which switches on or off the projection by the projector, an overheat indicator which informs of an overheat condition when a light source unit, a display device, a control circuit or the like overheats.

Further, provided on a back side or a back side panel of the housing are an input/output connector unit where USB terminals, an image signal input D-SUB terminal, an S terminal, an RCA terminal and the like are provided and various types of terminals 20 including a power supply adaptor plug and the like. Pluralities of outside air inlet holes 18 are formed in the back side panel. Then, pluralities of inside air outlet holes 17 are formed in a right-hand side panel which is a side plate of the housing, not shown, and a left-hand side panel 15 which is a side plate shown in FIG. 1. In addition, outside air inlet holes 18 are also formed in a corner portion of the left-hand side panel 15 which lies near the back side panel.

Figure 2:
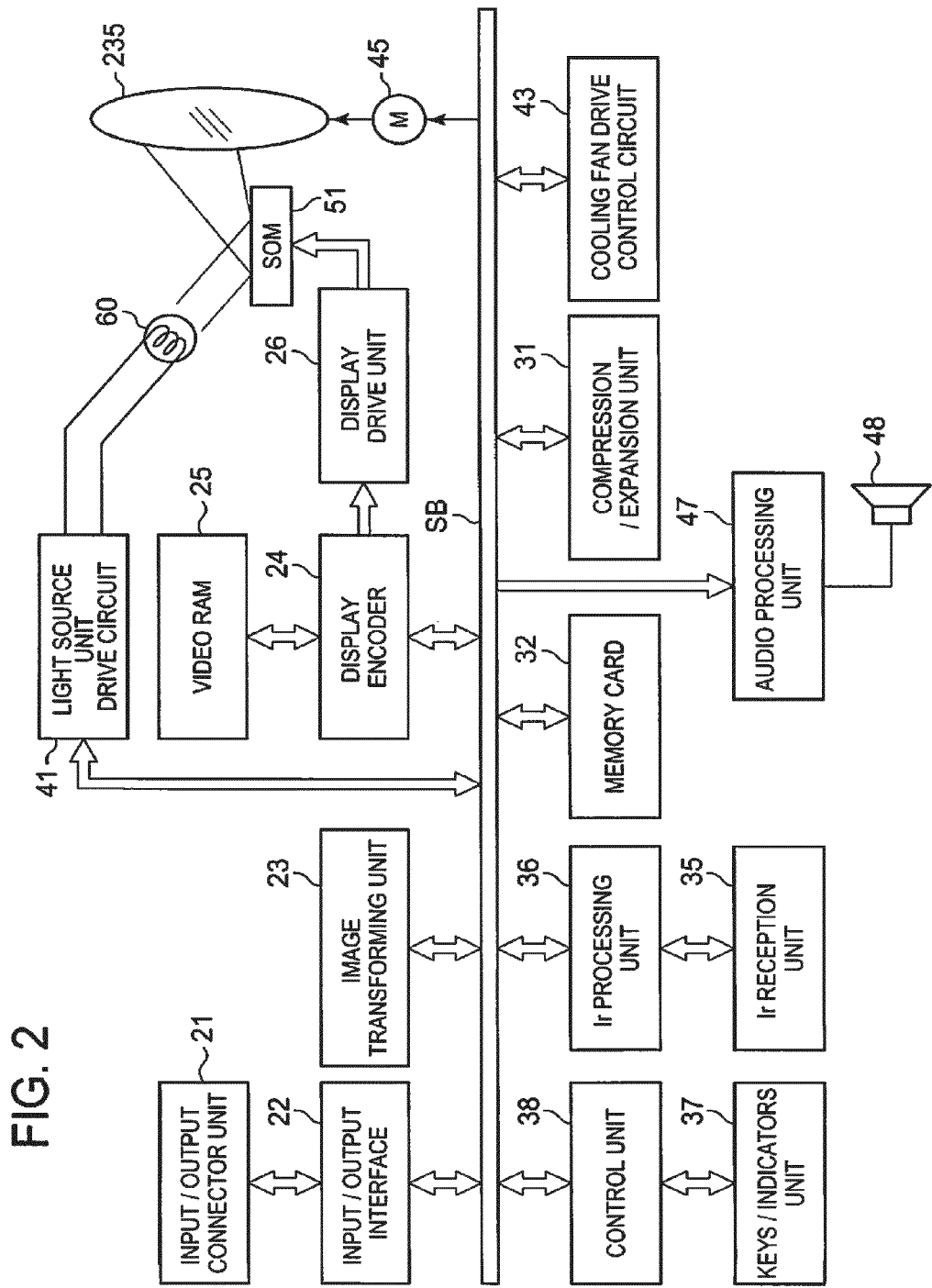
FIG. 2 is a functional block diagram of the projector according to the embodiment of the invention.
Figure 3:
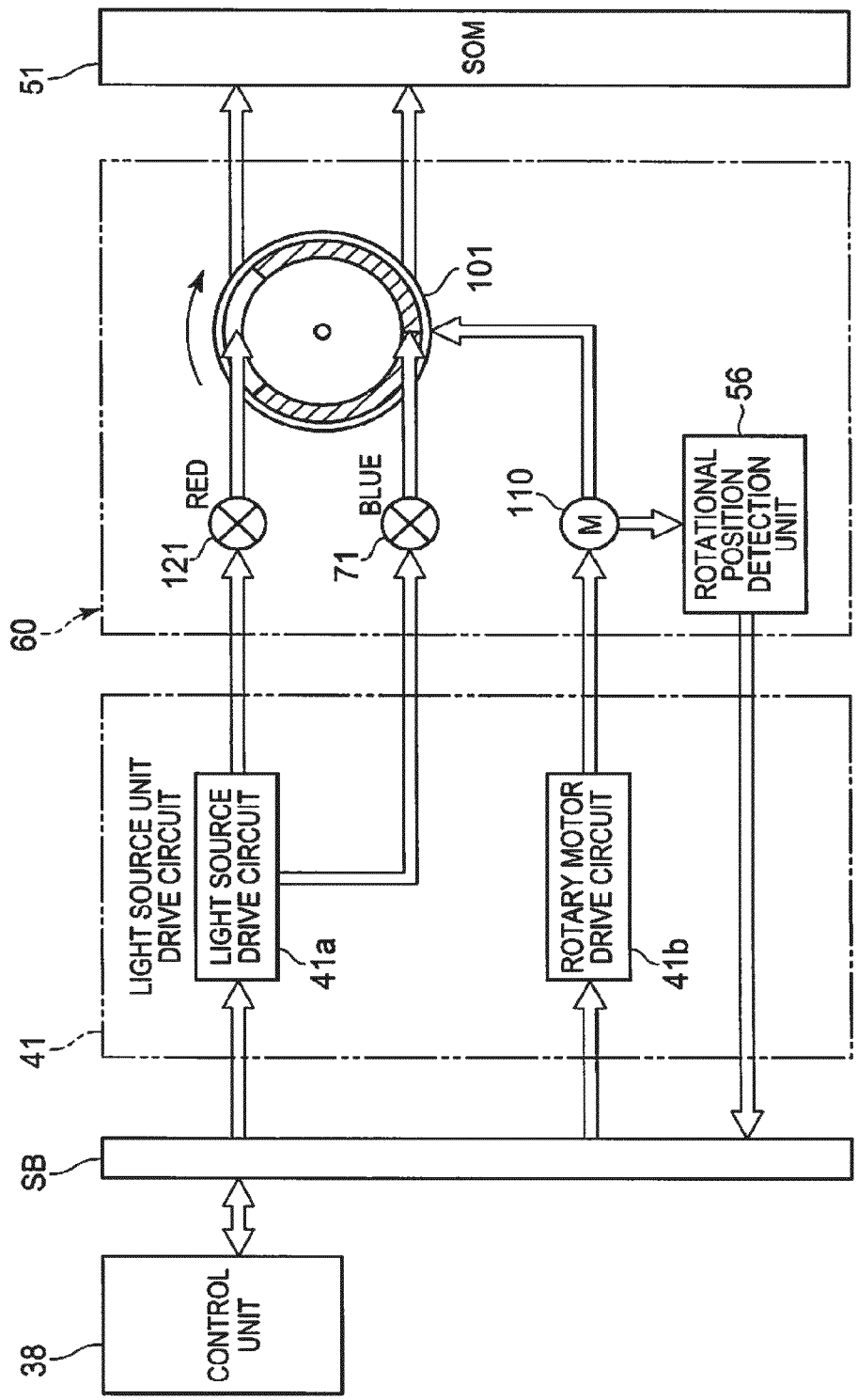
FIG. 3 is a functional block diagram of the projector according to the embodiment of the invention.

Next, a projector control unit of the projector 10 will be described by use of the functional block diagrams in FIGS. 2 and 3. The projector control unit includes a control unit 38, an image transforming unit 23, a display encoder 24, a display drive unit 26 and the like. The control unit 38 governs the control of respective operations of circuitries within the projector 10 and is made up of a CPU, a ROM which stores in a fixed fashion operation programs of various types of settings, a RAM which is used as a work memory and so forth.

The projector control unit controls so that image signals of various standards that are inputted from the input/output connector unit 21 are sent via an input/output interface 22 and a system bus (SB) to the image transforming unit 23 where the image signals are transformed so as to be unified into an image signal of a predetermined format which is suitable for display. Thereafter, the image signals so transformed are outputted to the display encoder 24.

In addition, the display encoder 24 deploys the image signals that have entered it on a video RAM 25 for storage therein and generates a video signal from the contents stored in the video RAM 25, outputting the video signal so generated to the display drive unit 26.

The display drive unit 26 drives a display device 51 which is a spatial optical modulator (SOM) at an appropriate frame rate in response to the image signal outputted from the display encoder 24. In this projector 10, a pencil of light which is emitted from a light source unit 60, that is, a pencil of light which is guided to a predetermined plane by a light guiding optical system of the light source unit 60 is collected to the display device 51 via a light source side optical system to thereby form an optical image based on reflected light reflected at the display device 51 which is controlled to be driven by the display drive unit 26. The image so formed is then projected on to a screen, not shown, for display via a projection side optical system, which will be described later. A movable lens group 235 of the projection side optical system is driven by a lens motor 45 for zooming or focusing.

In addition, an image compression/expansion unit 31 performs a recording operation in which a luminance signal and a color difference signal of an image signal are data compressed through ADCT and Huffman coding and the compressed data is sequentially written on a memory card 32 which is configured as a detachable recording medium. Further, when in a reproducing mode, the image compression/expansion unit 31 reads out image data recorded on the memory card 32 and expands individual image data which make up a series of dynamic images frame by frame. Then, the image data is outputted to the display encoder 24 via the image transforming unit 23 so as to enable the display of dynamic images based on the image data stored on the memory card 32.

Operation signals generated at the keys/indicators unit 37 which is made up of the main keys and indicators provided on the upper side panel 11 of the housing are sent out directly to the control unit 38, while key operation signals generated by operating keys on the remote controller are received by the Ir reception unit 35, and a code signal demodulated at an Ir processing unit 36 is outputted to the control unit 38.

In addition, an audio processing unit 47 is connected to the control unit 38 via the system bus (SB). This audio processing unit 47 includes a sound source circuit such as a PCM sound source. When in a projection mode and a reproducing mode, the audio processing unit 47 converts audio data into analog signals and drives a speaker 48 to output loudly sound or voice based on the audio data.

Additionally, the control unit 38 is connected to a light source unit drive circuit 41, and the control unit 38 and the light source unit drive circuit 41 function as a light source control unit which controls the light source unit 60 so that light source light of a predetermined wavelength band which is required in producing an image is emitted from the light source unit 60. Specifically, as is shown in FIG. 3, the control unit 38 controls a light source drive circuit 41a to thereby control individually the emissions of light of first light sources 71 of a blue light source device and second light sources 121 of a red light source device of the light source unit 60. In addition, the control unit 38 controls a rotary motor drive circuit 41b to thereby drive a wheel motor 110 so as to rotate a luminescent wheel 101 of a luminescent light emitting device in a circumferential direction at a predetermined rotation speed. A specific control of the emission of light of the respective light sources by the light source control unit in association with rotation of the luminescent wheel 101 will be described later.

A rotational position detection unit 56 which can detect a rotational position of the wheel motor 110 is connected to the wheel motor 110. The rotational position detection unit 56 is an optical sensor which optically detects a mark provided on part of a surface of the luminescent wheel 101 or a magnetic sensor which employs a Hall element. Rotational position data is detected by the optical sensor or the magnetic sensor and is then sent to the control unit 38.

Further, the control unit 38 causes a cooling fan drive control circuit 43 to detect temperatures through a plurality of temperature sensors which are provided in the light source unit 60 so as to control the rotational speed of a cooling fan based on the results of the temperature detection separately. In addition, the control unit 38 and the cooling fan drive control circuit 43 make the cooling fan continue to rotate even after the power supply of a projector main body is switched off by use of a timer or the like or make the power supply to the projector main body be cut off depending upon the results of the temperature detection by the temperature sensors.

Figure 4:
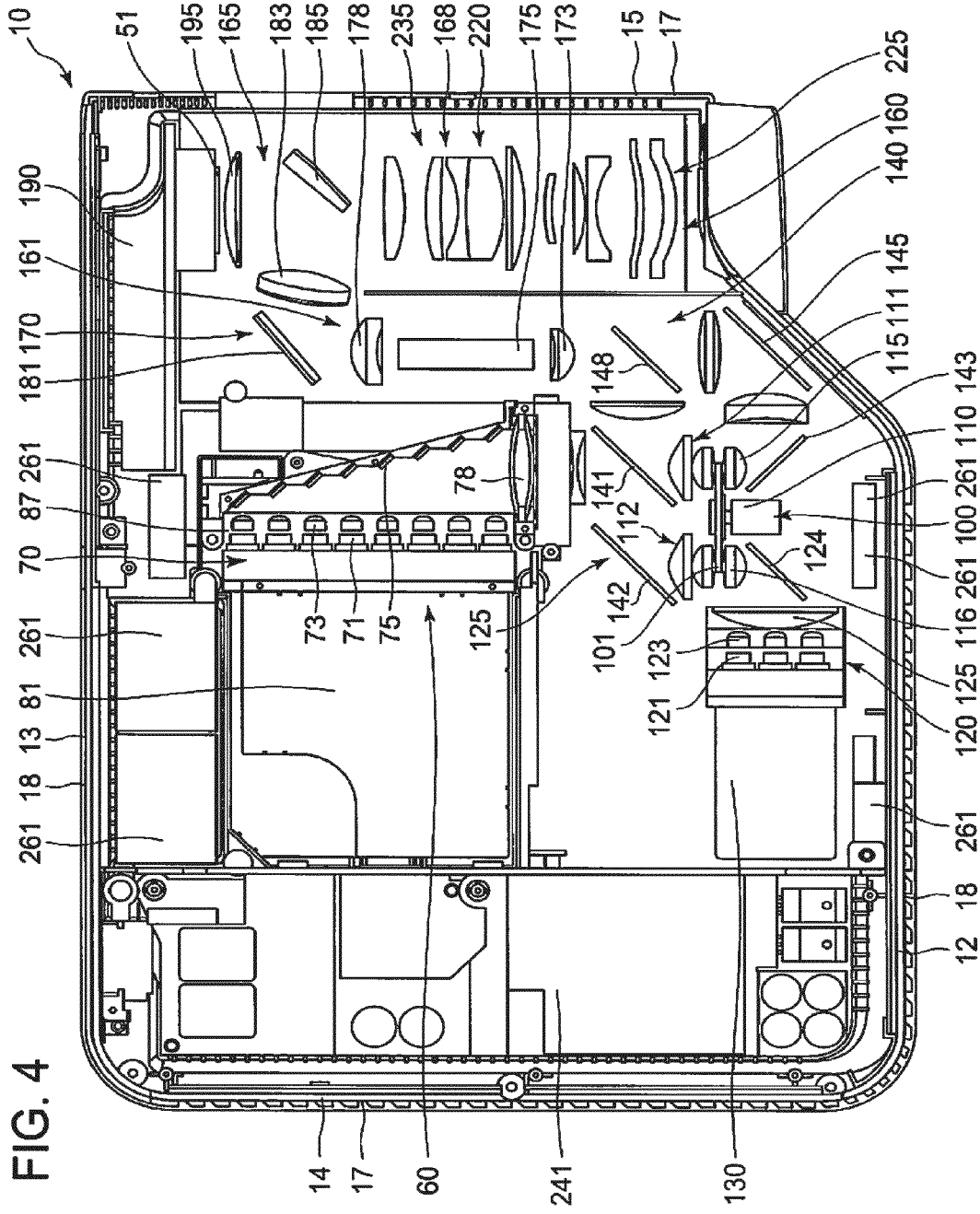
FIG. 4 is an exemplary plan view showing an interior construction of the projector according to the embodiment of the invention.

Next, an internal construction of the projector 10 will be described. FIG. 4 is an exemplary plan view showing an internal construction of the projector 10. As is shown in FIG. 4, the projector 10 includes a control circuit board 241 which is disposed in proximity to the right-hand side panel 14. This control circuit board 241 includes a power supply circuit block or a light source control block. In addition, the projector 10 includes the light source unit 60 which is provided to a side of the power supply circuit block 241, that is, at a substantially central portion of the projector housing. Further, the projector 10 includes an optical system unit 160 which is disposed between the light source unit 60 and the left-hand side panel 15.

The light source unit 60 includes the blue light source device 70 which is disposed at a substantially central portion of the projector housing with respect to a left-to-right direction and in proximity to the back panel 13, the luminescent light emitting device 100 which is disposed on an optical axis of a pencil of light emitted from the blue light source device 70 and in proximity to the front panel 12, the red light source device 120 which is disposed on a right-hand side of the luminescent light emitting device 100, and a light guiding optical system 140 which changes optical axes of rays of light of wavelength bands of the respective colors emitted from the luminescent wheel 101 in the luminescent light emitting device 100 so as to converge to the same optical axis to thereby guide the rays of light of wavelength bands of the respective colors to an entrance port of a light tunnel 175 which constitutes a predetermined plane.

The blue light source device 70 includes a light source group which is made up of a plurality of first light sources 71 which are disposed so that optical axes thereof become parallel to the back panel 13, a plurality of reflecting mirrors 75 which change the optical axis of light emitted from the individual first light sources 71 through 90 degrees so as to be directed towards the direction of the front panel 12, a collective lens 78 for collecting light emitted from the individual first light sources 71 and reflected on the reflecting mirrors 75, a heat sink 81 which is disposed between the first light sources 71 and the right-hand side panel 14, and a cooling fan 261.

In the light source group, the first light sources 71 which are semiconductor light emitting elements which emit light of blue wavelength band are arranged into a matrix configuration. It is preferable to adopt as the first light sources 71 high-output laser emitters which can emit a highly directional pencil of light. In addition, collimator lenses 73 are disposed individually on optical axes of the first light sources 71 on light emitting sides thereof and function as collective lenses which convert light emitted from the respective first light sources 71 into parallel light to increase the directionality of light emitted from the individual first light sources 71. The plurality of reflecting mirrors 75 are arranged in a step-like fashion so as to emit pencils of light emitted from the light source group of the first light sources 71 towards the collective lens 78 while reducing sectional areas of the pencils of light so emitted in a horizontal direction by narrowing spaces defined between pencils of light source light emitted from the light source group.

The cooling fan 261 is disposed between the heat sink 81 and the back panel 13, and the first light sources 71 are cooled by the cooling fan 261 and the heat sink 81. Further, a cooling fan 261 is also disposed between the reflecting mirrors 75 and the back panel 13, and the reflecting mirrors 75, the collective lens 78 and the first light sources 71 are cooled by the cooling fan 261.

The red light source device 120 includes a light source group which is made up of a plurality of second light sources 121 which are disposed so as to become parallel to the optical axes of the first light sources 71. In the light source group, the second light sources 121 which are semiconductor light emitting elements which emit light of red wavelength band are arranged into a matrix configuration. It is preferable to adopt as the second light sources 121 high-output laser emitters which can emit a highly directional pencil of light. In addition, collimator lenses 123 are disposed individually on optical axes of the second light sources 121 on light emitting sides thereof and function as collective lenses which convert light emitted from the respective second light sources 121 into parallel light to increase the directionality of light emitted from the individual second light sources 121.

In addition, the red light source device 120 includes a collective lens 125 which collects light from the collimator lenses 123 and a reflecting mirror 124 which changes the direction of light from the collective lens 125 through 90 degrees towards the direction of the back panel 13. Further, the red light source device 120 includes a heat sink 130 which is disposed on sides of the second light sources 121 which face the right-hand side panel 14. A cooling fan 261 is disposed between the heat sink 130 and the front panel 12, and the second light sources 121 are cooled by this cooling fan 261.

The luminescent light emitting device 100 includes the luminescent wheel 101 and the wheel motor 110. The luminescent wheel 101 has a circular disk shape and is disposed so as to be parallel to the front panel 12, that is, so as to be at right angles to the optical axis of light emitted from the blue light source device 70 and at right angles to the optical axis of light emitted from the red light source device 120. By this configuration, light emitted from the first light sources 71 is shone on to one surface (a surface confronting the back panel 13) of the luminescent wheel 101, and light from the second light sources 121 is shone on to the other surface (a surface confronting the front panel 12) of the luminescent wheel 101.

The wheel motor 110 is a drive unit which drives the luminescent wheel 101 to rotate in a circumferential direction. Further, the luminescent light emitting device 100 includes a collective lens group 111 which collects pencils of light emitted from the blue light source device 70 to the luminescent wheel 101 and which collects pencils of light emitted from the luminescent wheel 101 in the direction of the back panel 13 and a collective lens 115 which collects pencils of light emitted from the luminescent wheel 101 in the direction of the front panel 12. In addition, the luminescent light emitting device 100 includes a collective lens 116 which collects pencils of light emitted from the red light source device 120 to the luminescent wheel 101 and a collective lens group 112 which collects pencils of light emitted in the direction of the back panel 13 from the luminescent wheel 101.

When laser beams emitted from the individual first light sources 71 of the blue light source device 70 are shone on to a luminescent light emitting portion of the luminescent wheel 101 as excitation light, a green luminescent material in the luminescent light emitting portion is excited, and green light which is emitted by luminescence in every direction from the green luminescent material is emitted directly towards the back panel 13 or is reflected on the surface of the luminescent wheel 101 so as to then be emitted towards the back panel 13 to thereby be incident on the collective lens group 111. When laser beams of blue wavelength band which are emitted from the individual first light sources 71 of the blue light source device 70 are shone on to a diffuse transmission portion of the luminescent wheel 101, the blue laser beams which have entered the diffuse transmission portion are transmitted therethrough while being diffused by minute irregularities and are then incident on the collective lens 115. Further, when laser beams of red wavelength band emitted from the individual second light sources 121 of the red light source device 120 are shone on to the diffuse transmission portion of the luminescent wheel 101, the red laser beams which have entered the diffuse transmission portion are transmitted therethrough while being diffused by the minute irregularities and are then incident on the collective lens 112.

In this way, the luminescent wheel 101 is disposed on the optical paths of the first light sources 71 and the second light sources 121. Further, the first light sources 71, the second light sources 121 and the luminescent wheel 101 are disposed so that a light shining position of light from the first light sources 71 on the luminescent wheel 101 and a light shining position of light from the second light sources 121 on the luminescent wheel 101 are point symmetrical with respect to a rotational axis of the luminescent wheel 101. Namely, the light source unit 60 is configured so that the light shining position of light from the first light sources 71 and the light shining position of light from the second light sources 121 differ from each other on the luminescent wheel 101.

Consequently, the luminescent light emitting device 100 can emit red light, and blue light and green light from the different positions (the positions which are point symmetrical with respect to the rotational axis of the luminescent wheel) on the surface of the luminescent wheel 101. A cooling fan 261 is disposed between the wheel motor 110 and the front panel 12, and the luminescent light emitting device 100 is cooled by this cooling fan 261. A specific configuration of the luminescent wheel 101 will be described later.

The light guiding optical system 140 includes collective lenses which collect pencils of light of red, green and blue wavelength bands and reflecting mirrors, dichroic mirrors and the like which change optical axes of the pencils of light of the respective wavelength bands so that the pencils of light converge to the same optical axis. Specifically, a reflecting mirror 142 is disposed on the optical path of light which is emitted from a reflecting mirror 124 of the red light device 120 and then is transmitted through the diffuse transmission portion of the luminescent wheel 101 while being diffused, and this reflecting mirror 142 changes the optical axis of red light which is incident thereon through 90 degrees towards the direction of the left-hand side panel 15. A first dichroic mirror 141 is disposed in a position where the optical axis of light of red wavelength band reflected on the reflecting mirror 142 and the optical axis of light of blue wavelength band which passes through the collective lens 78 of the blue light source device intersect each other. This first dichroic mirror 141 transmits light of blue wavelength band and light of red wavelength band and reflects light of green wavelength band so as to change the optical axis of the light of green wavelength band through 90 degrees in the direction of the left-hand side panel 15.

In addition, a first reflecting mirror 143 is disposed on the optical axis of the light of blue wavelength band which is transmitted through the luminescent wheel 101 while being diffused, that is, between the collective lens 115 and the front panel 12. This first reflecting mirror 143 reflects light of blue wavelength band and changes the optical axis of the blue light through 90 degrees towards the direction of the left-hand side panel 15. Further, a second reflecting mirror 145 is disposed on the optical axis of the light of blue wavelength band which is reflected on the first reflecting mirror 143 and in proximity to the optical system unit 160, and this second reflecting mirror 145 changes the optical axis of the blue light through 90 degrees towards the direction of the back panel 13.

A second dichroic mirror 148 is disposed in a position where the optical axis of light of red wavelength band which is transmitted through the first dichroic mirror 141 and the optical axis of light of green wavelength band which is reflected by the first dichroic mirror 141 so that the optical axis thereof coincides with the optical axis of the light of red wavelength band intersect the optical axis of light of blue wavelength band reflected on the second reflecting mirror 145. This second dichroic mirror 148 transmits light of blue wavelength band and reflects light of green wavelength band and light of red wavelength band so as to change the optical axes of the light of green wavelength band and the light of red wavelength band through 90 degrees in the direction of the back panel 13. Collective lenses are respectively disposed between the dichroic mirrors and the reflecting mirrors. Further, a collective lens 173 is disposed in proximity to the light tunnel 175 for collecting light source light of wavelength bands of the respective colors to the entrance port of the light tunnel 175.

The optical system unit 160 has a substantially U-shape and includes three blocks such as an illumination side block 161 which is positioned to a left-hand side of the blue light source device 70, an image generation block 165 which is positioned in proximity to a position where the back panel 13 and the left-hand side panel 15 intersect each other, and a projection side block 168 which is positioned between the light guiding optical system 140 and the left-hand side panel 15.

The illumination side block 161 includes part of a light source side optical system 170 which collects light source light emitted from the light source unit 60 to the display device 51 which is included in the image generation block 165. As the light source side optical system 170 that is included in the illumination side block 161, there are included the light tunnel 175 which converts a pencil of light emitted from the light source unit 60 into a pencil of light whose intensity distribution is uniform, a collective lens 178 which collects light emitted from the light tunnel 175, an optical axis changing mirror 181 which changes optical axes of pencils of light emitted from the light tunnel 175 in the direction of the image generation block 165.

The image generating block 165 has, as the light source side optical system 170, a collective lens 183 which collects light source light which is reflected by the optical axis changing mirror 181 to the display device 51 and a shining mirror 185 which shines a pencil of light which has passed through the collective lens 183 onto the display device 51 at a predetermined angle. Further, the image generation block 165 includes a DMD which is the display device 51. A heat sink 190 is disposed between the display device 51 and the back panel 13 for cooling the display device 51. Thus, the display device 51 is cooled by this heat sink 190. A collective lens 195, which functions as a projection side optical system 220, is disposed in proximity to a front of the display device 51.

The projection side block 168 has a lens group of the projection-side optical system 220 which projects on-light reflected by the display device 51 onto the screen. The projection side optical system 220 is configured as a variable focus lens with a zooming function including a fixed lens group 225 which is incorporated in a fixed lens barrel and a movable lens group 235 which is incorporated in a movable lens barrel, whereby the variable focus lens enables zooming and focusing operations by moving the movable lens group 235 by the lens motor.

By configuring the projector 10 in the way described heretofore, when the luminescent wheel 101 is rotated and light is emitted from the blue light source device 70 and the red light source device 120 at different timings, light of red, green and blue wavelength bands can sequentially be incident on the light tunnel 175 via the light guiding optical system 140. Namely, the light source unit 60 which is installed in the projector 10 can emit sequentially monochromatic light of red, green and blue wavelength bands therefrom within one frame when the light source side control part of the projector control unit controls the first light sources 71 and the second light sources 121 so as to emit light separately.

Then, red, green and blue light emitted from the light source unit 60 is sequentially incident on the display device 51 via the light source side optical system 170. Therefore, a color image which is enlarged via the lens groups can be generated on the screen when the DMD, which is the display device 51 of the projector 10, time shares the display of light of the respective colors in accordance with data.

Figure 5A:
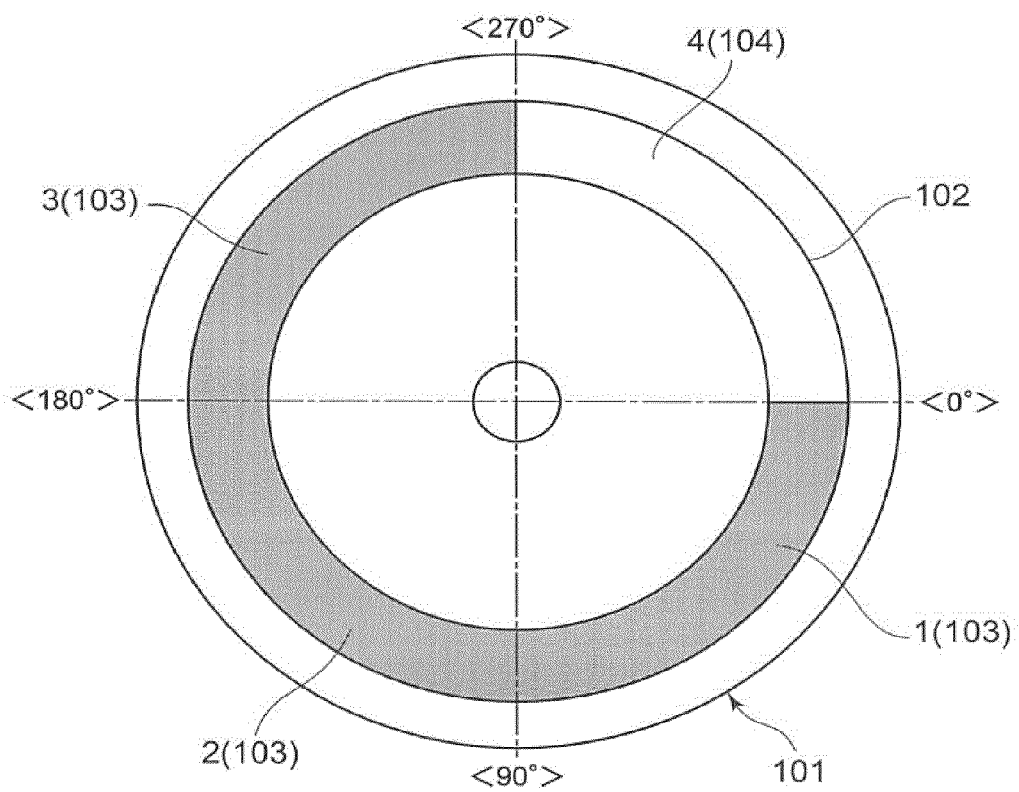
FIG. 5 shows an exemplary front view and an exemplary partially sectional plan view of a luminescent wheel according to the embodiment of the invention.
Figure 5B:
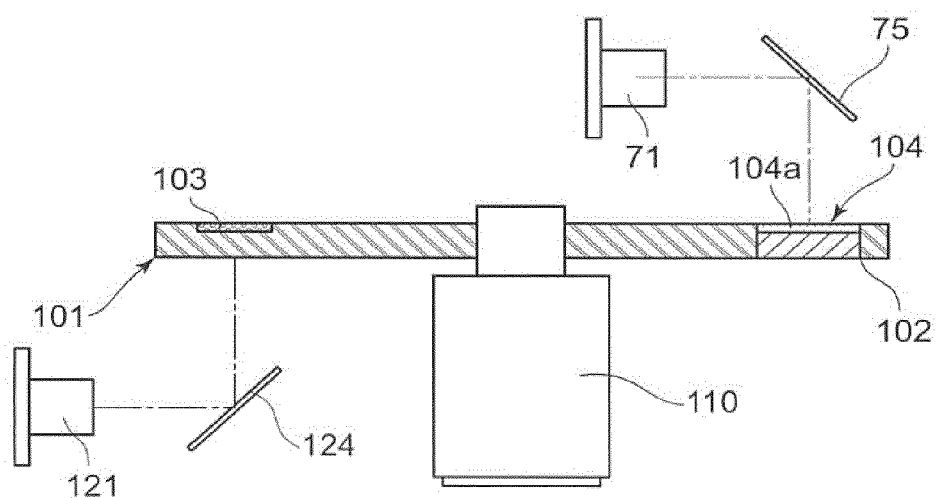
Figure 6A:
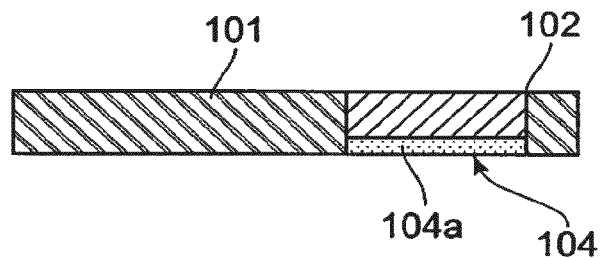
FIG. 6 is a partially sectional view showing another configuration of a diffuse transmission portion according to the embodiment of the invention.
Figure 6B:
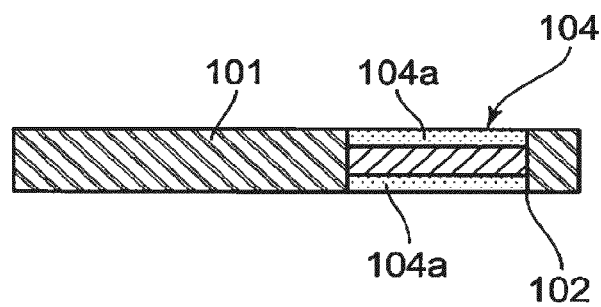
Figure 6C:
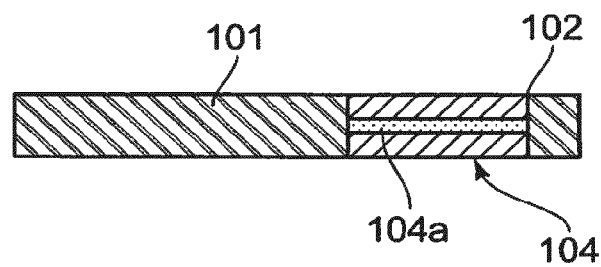
Figure 6D:
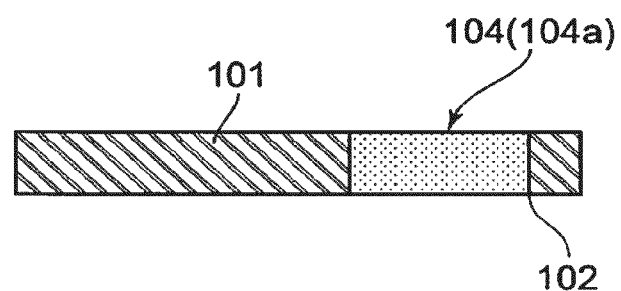
Figure 8A:
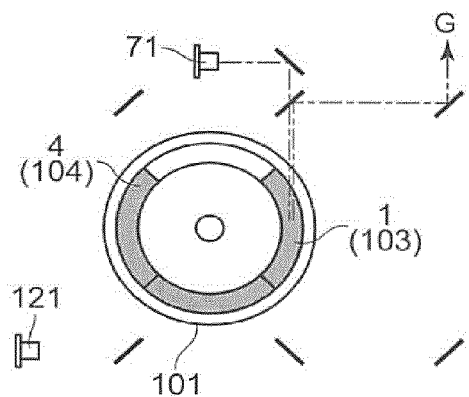
FIG. 8 shows exemplary diagrams which depict light emission controls of the first light source and the second light source and a rotational driving control of a luminescent wheel which are necessary for light of respective colors to be emitted from the light source unit according to the embodiment of the invention.
Figure 8D:
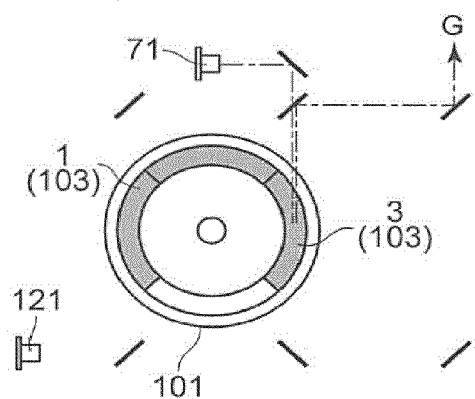
Figure 8B:
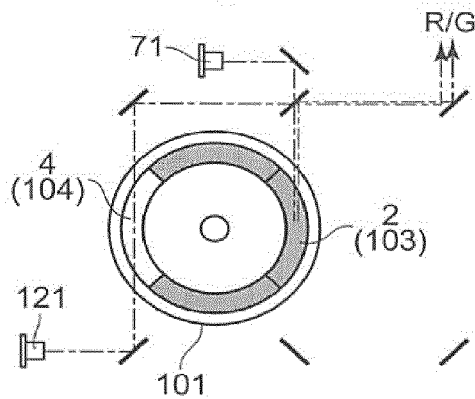
Figure 8E:
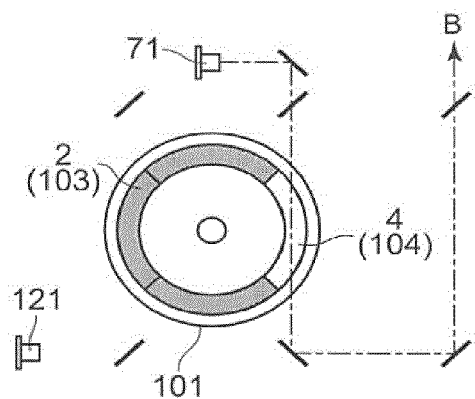
Figure 8C:
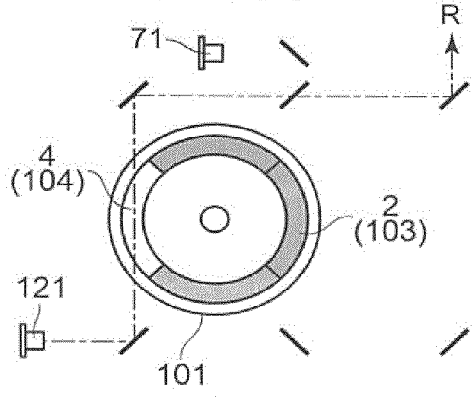

Next, referring to FIG. 5, a specific configuration of the luminescent wheel 101 will be described. As is shown at (a), (b) in FIG. 5, the luminescent wheel 101 is made up of a circular disk-shaped metallic base of copper or aluminum, and an arc-shaped cutout is provided in the base. The cutout portion 102 is a through opening which passes through the base from one surface to the other surface thereof, that is, a surface of a side where the first light sources 71 are disposed to a surface on an opposite side.

The luminescent wheel 101 has a luminescent light emitting portion 103 in a recess portion provided on the one surface of the side of the base where the first light sources 71 are disposed and a diffusive transmission portion 104 in the cutout portion 102. The luminescent light emitting portion 103 is formed into a layer by mixing a green luminescent material which emits luminescent light of green wavelength band by receiving light emitted from the first light sources 71 of the blue light source device 70 as excitation light uniformly in a binder such as a silicone resin having heat resistance and high transmissivity and has an arc-like shape. In addition, a mirror finish is provided on the surface of the side of the base which faces the first light sources 71 through silver deposition or the like so as to form a reflecting surface which reflects light, and the layer of the luminescent material is formed on a surface of a recess portion which is mirror finished in the way described above.

The diffuse transmission portion 104 is an optical part which provides a diffuse effect without changing the wavelength bands of light incident thereon. In the diffuse transmission portion 104, a blast treatment is applied to a surface of one side of a glass material to thereby form a portion 104a which diffuses light by minute irregularities. In addition, the diffuse transmission portion 104 has an arc-like shape which corresponds to the arc-shaped cutout portion 102 in the luminescent wheel 101 and is disposed so as to close the arc-shaped cutout portion 102. Namely, the luminescent light emitting portion 103 and the diffuse transmission portion 104 are disposed end to end in a circumferential direction on the surface of the side where the first light sources 71 are disposed. The disposition of the light diffusing portion 104a of the diffuse transmission portion 104 is not limited to where the light diffusing portion 104a is disposed on the side of the luminescent wheel 101 where the first light sources 71 are disposed as has been described above. For example, as is shown at (a) in FIG. 6, a light diffusing portion 104a may be disposed on a side of the luminescent wheel 101 which faces the second light sources 121. In addition, as is shown at (b) in FIG. 6, a light diffusing portion 104a may be disposed on each of the sides of the luminescent wheel 101 which face the first light sources 71 and the second light sources 121, respectively. Alternatively, as is shown in at (c) in FIG. 6, a light diffusing portion 104a is formed of a light diffusive member which is formed by adding a light diffusive filler in a transparent base of glass, plastic or resin, and the light diffusive member can also be disposed at a center of the luminescent wheel 101 with respect to a thickness direction. In addition, as is shown at (d) in FIG. 6, a configuration can also be adopted in which the whole of a member which is fitted in the cutout portion 102 is formed of a light diffusive member. When adopting the configurations shown at (b) to (d) in FIG. 6, laser beams from the first light sources 71 and the second light sources 121 are preferably transmitted through the light diffusing member while being diffused symmetrically with each other and uniformly. Further, in consideration of attenuation of laser beams which are transmitted through the light diffusive member, it is preferable to adopt the configuration shown at (c) in FIG. 6.

Consequently, in this light source unit 60, laser beams from the first light sources 71 are allowed to be incident on the luminescent light emitting portion 103 and the diffuse transmission portion 104 of the luminescent wheel 101 which is rotating, and laser beams from the second light sources 121 are also allowed to be incident on the diffuse transmission portion 104 of the luminescent wheel 101 which is rotating.

The luminescent wheel 101 is formed in the way described above so that blue and red laser beams can be shone on to the different positions on the surface thereof, whereby the light source unit 60 can emit synthesized light or monochromatic light. Hereinafter, the control of emission of light from the first light sources 71 and the second light sources 121 to generate light of the respective colors will be described by reference to FIGS. 7 to 13.

FIG. 7 is a timing chart showing timings at which the first light sources 71 and the second light sources 121 are turned on and off and shows colors of light emitted from the light source unit 60, wheel angles, and shining positions of light from the first light sources 71 and the second light sources 121 on the luminescent wheel 101 along with the timings. Wheel angles in the figure will be described. The luminescent wheel 101 has, as is shown in FIG. 5, the luminescent light emitting portion 103 and the diffuse transmission portion 104, which are shaped like a belt. Then, the luminescent light emitting portion 103 is divided into three areas such as a first area 1, a second area 2 and a third area 3. In addition, the diffuse transmission portion 104 is referred to as a fourth area 4. Here, a position on the wheel surface (specifically, a position on the wheel surface which is disposed in the center of the shining area of light from the first light sources 71) is represented by angles with a position of an imaginary boundary line between the first area 1 and the fourth area 4 referred to as a reference (0 degree). This position moves as the luminescent wheel 101 rotates. Hereinafter, the center of the shining area is referred to as the center of the shining area of light from the first light sources 71.

As is shown in FIG. 7 and at (a) in FIG. 8, the light source control part executes a control in which the first light sources 71 are turned on, while the second light sources 121 are turned off when a wheel position in which the wheel angle is in a range of 0 degree to 90 degrees is positioned at the center of the shining area. By this control, light emitted from the first light sources 71 is shone on to the first area 1 (the luminescent light emitting portion 103) of the luminescent wheel 101. Therefore, green luminescent light (G) emitted from the luminescent wheel 101 is emitted from the light source unit 60.

Then, as is shown in FIG. 7 and at (b) in FIG. 8, the light source control part executes a control in which both the first light sources 71 and the second light sources 121 are turned on when a wheel position in which the wheel angle is in a former range of 90 degrees to 135 degrees within a range of 90 degrees to 180 degrees is positioned at the center of the shining area. By this control, light from the first light sources 71 is shone on to the second area 2 (the luminescent light emitting portion 103), and therefore, green luminescent light (G) emitted from the luminescent wheel 101 is emitted from the light source unit 60. Further, light from the second light sources 121 is shone onto the fourth area 4 (the diffuse transmission portion 104), and therefore, red light (R) which passes through the luminescent wheel 101 while being diffused is emitted from the light source unit 60. Namely, light of a wavelength band of yellow (Y) which is a complementary color in which green light is synthesized with red light is emitted from the light source unit 60.

In addition, as is shown in FIG. 7 and at (c) in FIG. 8, the light source control part executes a control in which the first light sources 71 are turned off and the second light sources 121 are turned on when a wheel position in which the wheel angle is in a latter half range of 135 degrees to 180 degrees within the range of 90 degrees to 180 degrees is positioned at the center of the shining area. By this control, light emitted from the second light sources 121 is shone on to the fourth area 4 (the diffuse transmission portion 104) of the luminescent wheel 101, and therefore, red light (R) which passes through the luminescent wheel 101 while being diffused is emitted from the light source unit 60.

Further, as is shown in FIG. 7 and at (d) in FIG. 8, the light source control part executes a control in which the first light sources 71 are turned on, while the second light sources 121 are turned off when a wheel position in which the wheel angle is in a range of 180 degrees to 270 degrees is positioned at the center of the shining area. By this control, light emitted from the first light sources 71 is shone on to the third area 3 (the luminescent light emitting portion 103) of the luminescent wheel 101. Therefore, green luminescent light (G) emitted from the luminescent wheel 101 is emitted from the light source unit 60.

In addition, as is shown in FIG. 7 and at (e) in FIG. 8, the light source control part executes a control in which the first light sources 71 are turned on, while the second light sources 121 are turned off when a wheel position in which the wheel angle is in a range of 270 degrees to 360 degrees (0 degree) is positioned at the center of the shining area. By this control, light emitted from the first light sources 71 is shone on to the fourth area 4 (the diffuse transmission portion 104) of the luminescent wheel 101. Therefore, blue light (B) which passes through the luminescent wheel 101 while being diffused is emitted from the light source unit 60.

Namely, this light source control part controls the first light sources 71 and the second light sources 121 so as to emit light simultaneously or separately. Consequently, the light source unit 60 is controlled by the light source control part so as to include not only a period of time when monochromatic light of wavelength bands of red, green and blue which are the three primary colors of light is emitted separately but also a period of time when red light and green light are synthesized by a predetermined period of time for emission. In addition, when the light source unit 60 is controlled by the light source control part so that the first light sources 71 are turned off and the second light sources 121 are turned on while the wheel position is such that the wheel angle is in the range of 90 degrees to 180 degrees, the first light sources 71 are controlled to be turned on as required while light of red wavelength band is being emitted, whereby a period of time to emit light of the wavelength band of yellow which is a complementary color can be allocated arbitrarily.

Of course, the light source unit 60 can also be configured so as not to emit the light of the wavelength band of yellow which is the complementary color. Namely, as is shown in FIG. 9, the light source control part executes a control in which the first light sources 71 are not turned on and only the second light sources 121 are turned on when a wheel position in which the wheel angle is in the range of 90 degrees to 180 degrees is positioned at the center of the shining area, whereby red light (R) which passes through the luminescent wheel 101 while being diffused can be emitted from the light source unit 60. Consequently, the projector 10 which installs this light source unit 60 can project projection images of various luminance modes on to the screen.

Consequently, according to the embodiment, the light source unit 60 can be provided which can increase the luminance of the screen by including the first light sources 71 which excite the luminescent material, the luminescent wheel 101 which has the luminescent material having the good luminous efficiency and the monochromatic-color second light sources 121 which emit light of red wavelength band corresponding to the luminescent material having the relatively low luminous efficiency, which is the light of red wavelength band, for example, without forming the red luminescent material on the luminescent wheel 101, and the projector which includes the light source unit 60 can be provided.

In addition, the light source unit 60 has the simple configuration in which laser beams from the first light sources 71 and laser beams from the second light sources 121 are shone on to the single luminescent wheel 101 so as to emit light of the respective colors in a sequential fashion. Therefore, the projector 10 which includes this light source unit 60 can be reduced in size.

Further, the first light sources 71 and the second light sources 121 are made up of the laser emitters, and therefore, not only can the luminance of the screen be increased easily, but also the light source unit 60 can be reduced in size. The first light sources 71 and the second light sources 121 do not necessarily have to be made up of the laser emitters, and therefore, a number of high-output light emitting diodes can be provided to realize an increase in luminance of the screen.

In addition, the light source control part which controls the light source unit 60 of this embodiment can control the first light sources 71 and the second light sources 121 so as to emit light simultaneously or separately. Therefore, the light source unit 60 can emit synthesized light or monochromatic light.

Additionally, the light source control part controls the first light sources 71 and the second light sources 121 so as to emit light simultaneously only for the predetermined period of time at the predetermined timing so that luminous light emitted from the luminescent light emitting portion 103 when it receives light from the first light sources 71 and light emitted from the second light sources 121 and transmitted through the diffuse transmission portion 104 while being diffused are synthesized only for the predetermined period of time, whereby the light source unit 60 can emit not only light of monochromatic color of wavelength bands of red, green and blue which are the three primary colors of light but also synthesized light of wavelength band of yellow which is the complementary color, thereby making it possible to realize an increase in luminance and color reproduction capability of a projection image projected from the projector 10.

The luminescent wheel can also be provided in the light source unit 60 which can not only generate the light of wavelength band of yellow which is the complementary color but also generate light of wavelength band of magenta by turning on the first light sources 71 and the second light sources 121 simultaneously only for the predetermined period of time.

Figure 10:
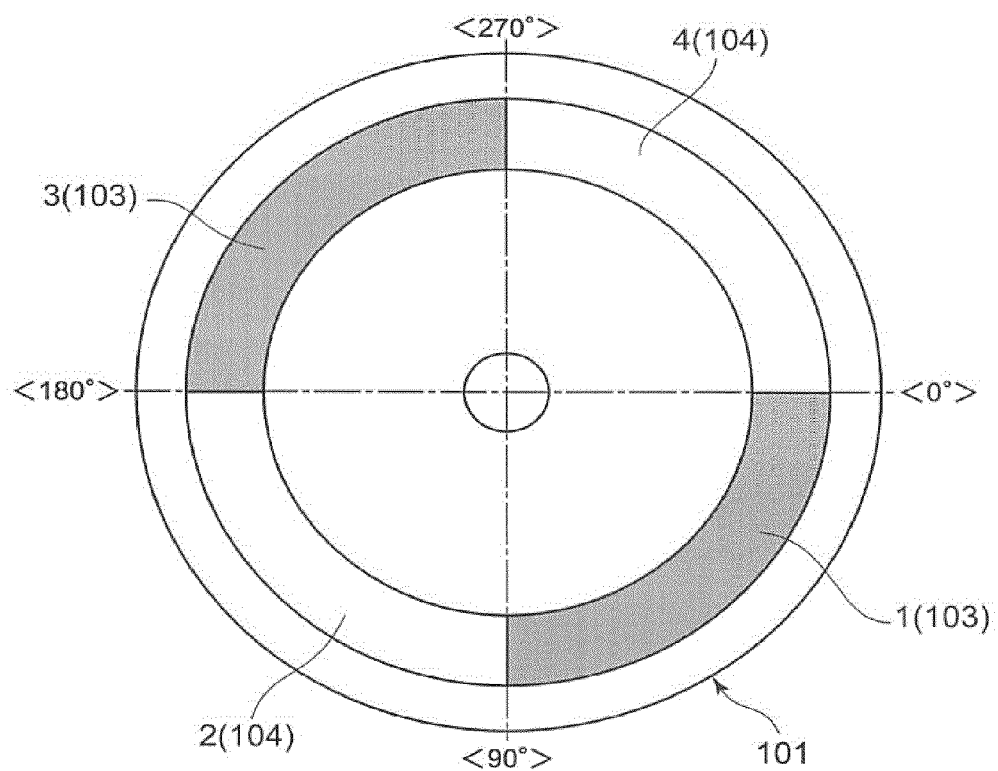
FIG. 10 is an exemplary front view of a luminescent wheel according to a modified example of the invention.

The configuration of the luminescent wheel 101 in which light of wavelength band of magenta is generated is shown in FIG. 10, for example. As is shown therein, a first area 1 which is referred to as a luminous light emitting portion 103 on which a layer of a green luminescent material is formed, a second area 2 which is referred to as a diffuse transmission portion 104, a third area 3 which is referred to as a luminescent light emitting portion 103 on which a layer of a green luminescent material is formed and a fourth area 4 which is referred to as a diffuse transmission portion 104 are aligned end to end in a circumferential direction.

Then, as is shown in FIG. 11, the light source control part executes a control in which the first light sources 71 are turned on, while the second light sources 121 are turned off when a wheel position in which the wheel angle is in the range of 0 degree to 90 degrees is positioned at the center of the shining area. By this control, light emitted from the first light sources 71 is shone on to the first area 1 (the luminescent light emitting area 103) of the luminescent wheel 101. Therefore, green luminescent light (G) emitted from the luminescent wheel 101 is emitted from the light source unit 60.

In addition, the light source control part executes a control in which the first light sources 71 are turned off and the second light sources 121 are turned on when a wheel position in which the wheel angle is in the range of 90 degrees to 180 degrees is positioned at the center of the shining area. By this control, light emitted from the second light sources 121 is shone on to the fourth area 4 (the diffuse transmission area 104), and therefore, red light (R) transmitted through the luminescent wheel 101 while being diffused is emitted from the light source unit 60.

The light source control part executes a control in which the first light sources 71 are turned on, while the second light sources 121 are turned off when a wheel position in which the wheel angle is in a range of 180 degrees to 270 degrees is positioned at the center of the shining area. By this control, light emitted from the first light sources 71 is shone on to the third area 3 (the luminescent light emitting portion 103) of the luminescent wheel 101, and therefore, green luminescent light (G) emitted from the luminescent wheel 101 is emitted from the light source unit 60.

Then, the light source control part executes a control in which both the first light sources 71 and the second light sources 121 are turned on when a wheel position in which the wheel angle is in a range of 270 degrees to 315 degrees within a range of 270 degrees to 360 degrees is positioned at the center of the shining area. By this control, light emitted from the first light sources 71 is shone on to the fourth area 4 (the diffuse transmission area 104) of the luminescent wheel 101. Therefore, blue light (B) transmitted through the luminescent wheel 101 while being diffused is emitted from the light source unit 60. Further, light from the second light sources 121 is shone on to the second area 2 (the diffuse transmission portion 104) and therefore, red light (R) transmitted through the luminescent wheel 101 while being diffused is emitted from the light source unit 60. Namely, light of wavelength band of magenta (M) which is a complementary color in which blue light is synthesized with red light is emitted from the light source unit 60.

Then, the light source control part executes a control in which the first light sources 71 are turned on, while the second light sources 121 are turned off when a wheel position in which the wheel angle is in a latter half range of 315 degrees to 360 degrees (0 degree) within the range of 270 degrees to 360 degrees is positioned at the center of the shining area. By this control, light emitted from the first light sources 71 is shone on to the fourth area 4 (the diffuse transmission portion 104) of the luminescent wheel 101, and therefore, blue light (B) which is transmitted through the luminescent wheel 101 while being diffused is emitted from the light source unit 60. In addition, when the light source unit 60 is controlled by the light source control part so that the first light sources 71 are turned on and the second light sources 121 are turned off while the wheel position is such that the wheel angle is in the range of 270 degrees to 360 degrees, the second light sources 121 are controlled to be turned on as required while light of blue wavelength band is being emitted, whereby a period of time to emit light of the wavelength band of magenta which is a complementary color can be allocated arbitrarily.

Namely, this light source control part controls the first light sources 71 and the second light sources 121 so as to emit light simultaneously or separately. Consequently, the light source unit 60 is controlled by the light source control part so as to include not only a period of time when monochromatic light of wavelength bands of red, green and blue which are the three primary colors of light is emitted separately but also a period of time when red light and blue light are synthesized together by a predetermined period of time for emission.

In this way, when the light source control part controls the first light sources 71 and the second light sources 121 so as to emit light simultaneously only for the predetermined period of time at the predetermined timing so that light from the first light sources 71 which are transmitted through the diffuse transmission portion 104 while being diffused and light from the second light sources 121 which are transmitted through the diffuse transmission portion while being diffused are synthesized only for the predetermined period of time, whereby the light source unit 60 can emit not only light of monochromatic color of wavelength bands of red, green and blue which are the three primary colors of light but also synthesized light of wavelength band of magenta which is the complementary color, thereby making it possible to realize an increase in luminance and color reproduction capability of a projection image projected from the projector 10.

In addition, there may be a situation where the light source unit 60 includes a luminescent wheel which can not only generate the light of wavelength band of yellow or magenta by turning on the first light sources 71 and the second light sources 121 simultaneously only for the predetermined period of time as has been described above but also generate both the light of wavelength band of yellow which is the complementary color and the light of wavelength band of magenta which is also the complementary color within one frame.

Figure 12:
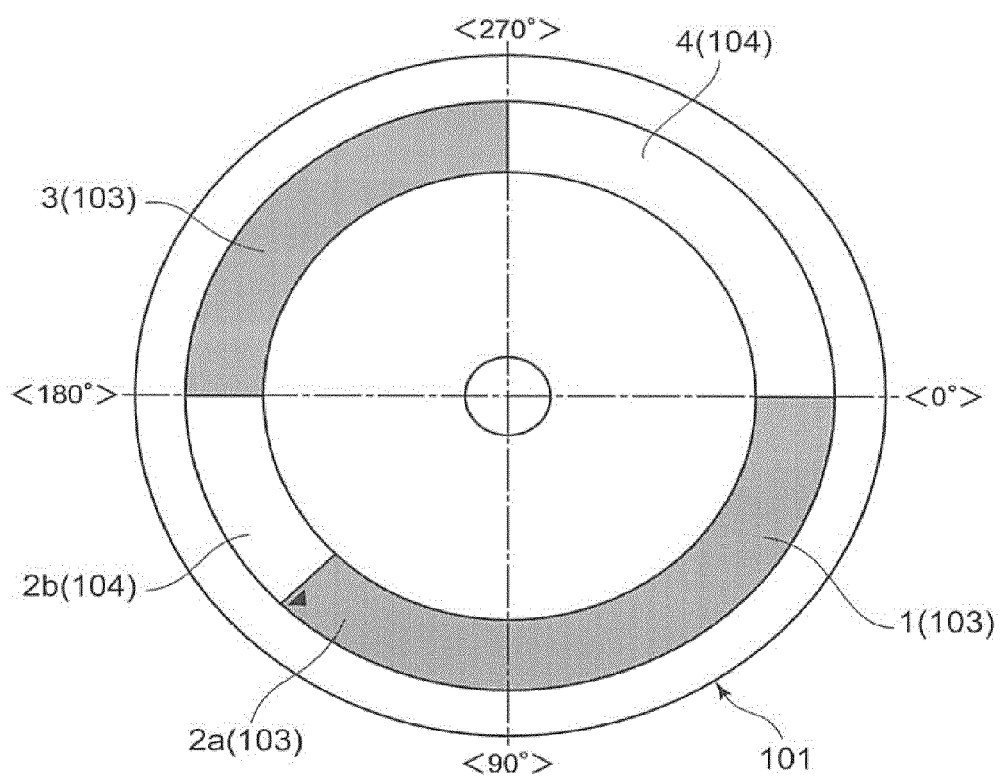
FIG. 12 is an exemplary front view of a luminescent wheel according to a different modified example of the invention.

The configuration of the luminescent wheel 101 which can generate both the light of wavelength band of yellow and the light of wavelength band of magenta is shown in FIG. 12, for example. As is shown therein, a first area 1 which is referred to as a luminous light emitting portion 103 on which a layer of a green luminescent material is formed, a second A area 2a which is referred to as a luminescent light emitting portion 103 on which a layer of a green luminescent material is formed, a second B area 2b which is referred to as a diffuse transmission portion 104, a third area 3 which is referred to as a luminescent light emitting portion 103 on which a layer of a green luminescent material is formed and a fourth area 4 which is referred to as a diffuse transmission portion 104 are aligned end to end in a circumferential direction.

Figure 13:
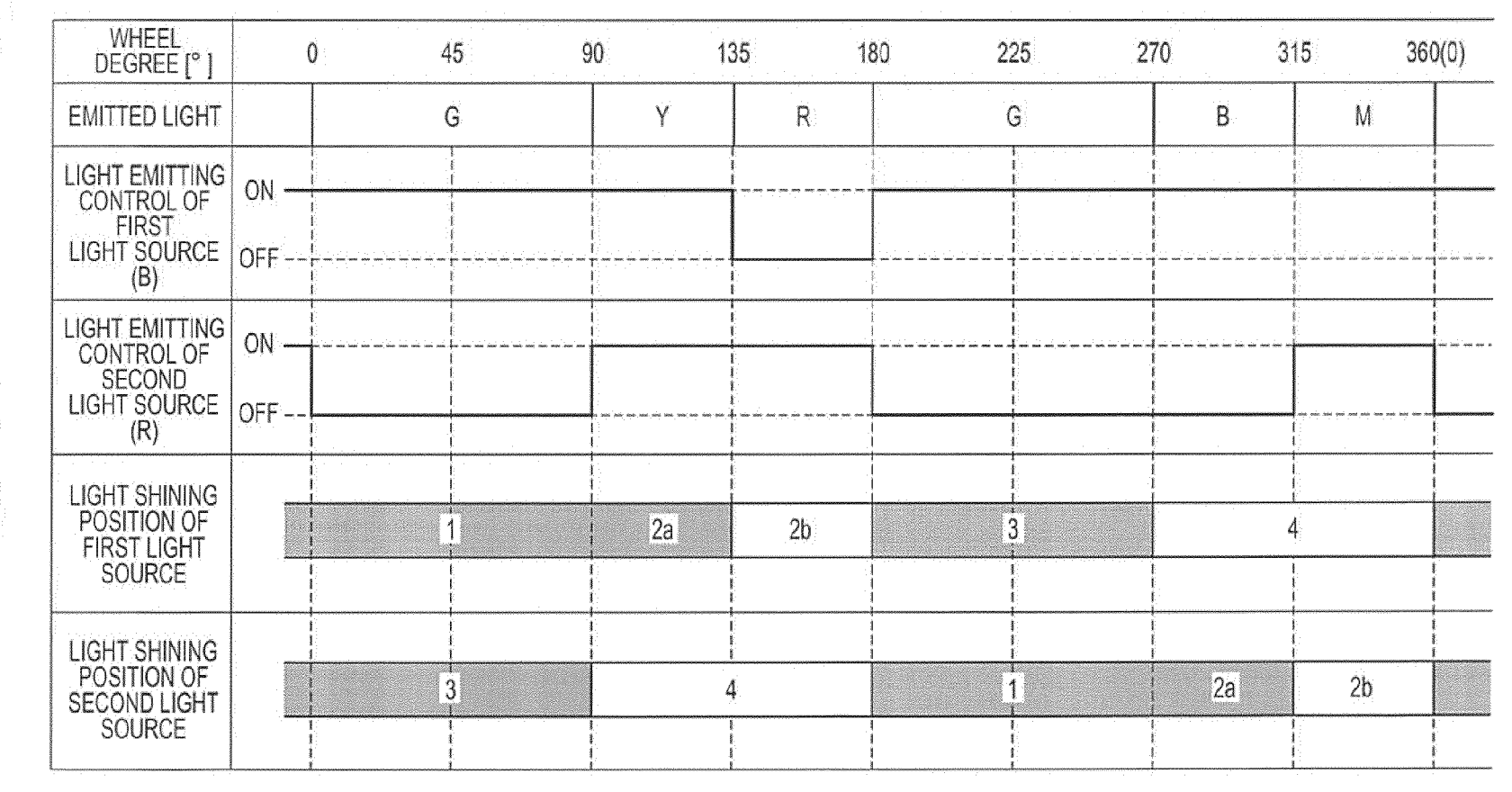

Then, as is shown in FIG. 13, the light source control part executes a control in which the first light sources 71 are turned on, while the second light sources 121 are turned off when a wheel position in which the wheel angle is in the range of 0 degree to 90 degrees is positioned at the center of the shining area. By this control, light emitted from the first light sources 71 is shone on to the first area 1 (the luminescent light emitting area 103) of the luminescent wheel 101. Therefore, green luminescent light (G) emitted from the luminescent wheel 101 is emitted from the light source unit 60.

In addition, the light source control part executes a control in which both the first light sources 71 and the second light sources 121 are turned on when a wheel position in which the wheel angle is in a range of 90 degrees to 135 degrees within a range of 90 degrees to 180 degrees is positioned at the center of the shining area. By this control, light emitted from the first light sources 71 is shone on to the second A area 2a (the luminescent light emitting portion 103), and therefore, green luminescent light (G) emitted from the luminescent wheel 101 is emitted from the light source unit 60. Further, light emitted from the second light sources 121 is shone on to the fourth area 4 (the diffuse transmission area 104), and therefore, red light (R) transmitted through the luminescent wheel 101 while being diffused is emitted from the light source unit 60. Namely, light of wavelength band of yellow (Y) is emitted from the light source unit 60 which is a complementary color of green light and red light which are synthesized.

Additionally, the light source control part executes a control in which the first light sources 71 are turned off, while the second light sources 121 are turned on when a wheel position in which the wheel angle is in a latter half range of 135 degrees to 180 degrees within the range of 90 degrees to 180 degrees is positioned at the center of the shining area. By this control, light emitted from the second light sources 121 is shone on to the fourth area 4 (the diffuse transmission portion 104) of the luminescent wheel 101, and therefore, red light (R) transmitted through the luminescent wheel 101 while being diffused is emitted from the light source unit 60.

Then, the light source control part executes a control in which the first light sources 71 are turned on, while the second light sources 121 are turned off when a wheel position in which the wheel angle is in a range of 180 degrees to 270 degrees is positioned at the center of the shining area. By this control, light emitted from the first light sources 71 is shone on to the third area 3 (the luminescent light emitting portion 103) of the luminescent wheel 101, and therefore, green luminescent light (G) emitted from the luminescent wheel 101 is emitted from the light source unit 60.

In addition, the light source control part executes a control in which the first light sources 71 are turned on, while the second light sources 121 are turned off when a wheel position in which the wheel angle is in a range of 270 degrees to 315 degrees within a range of 270 degrees to 360 degrees is positioned at the center of the shining area. By this control, light emitted from the first light sources 71 is shone on to the fourth area 4 (the diffuse transmission area 104) of the luminescent wheel 101. Therefore, blue light (B) transmitted through the luminescent wheel 101 while being diffused is emitted from the light source unit 60.

Then, the light source control part executes a control in which both the first light sources 71 and the second light sources 121 are turned on when a wheel position in which the wheel angle is in a latter half range of 315 degrees to 360 degrees (0 degree) within the range of 270 degrees to 360 degrees is positioned at the center of the shining area. By this control, light emitted from the first light sources 71 is shone on to the fourth area 4 (the diffuse transmission area 104) of the luminescent wheel 101. Therefore, blue light (B) transmitted through the luminescent wheel 101 while being diffused is emitted from the light source unit 60. Further, light from the second light sources 121 is shone on to the second B area 2b (the diffuse transmission portion 104) and therefore, red light (R) transmitted through the luminescent wheel 101 while being diffused is emitted from the light source unit 60. Namely, light of wavelength band of magenta (M) which is a complementary color in which blue light is synthesized with red light is emitted from the light source unit 60.

The light source unit 60 can be provided which can emit light of various wavelength bands by disposing the luminescent light emitting portion 103 and the diffuse transmission portion 104 on the luminescent wheel 101 and controlling the emission of light from the first light sources 71 and the second light sources 121 by combining variously the timings at which the first light sources 71 and the second light sources 121 are turned on.

The light source control part can freely adjust the luminance on the screen by controlling the times when the first light sources 71 and the second light sources 121 are turned on so that times during which light of the respective colors is emitted become short. In addition, the light source control part can control the first light sources 71 or the second light sources 121 so as to suppress the output thereof only when light of a predetermined wavelength band is emitted, whereby the tone of the screen can also be adjusted.

In the light source unit 60, the luminescent plate is formed as the circular disk-shaped luminescent wheel 101, and this luminescent wheel 101 is made to rotate, whereby the light source unit 60 is made simple in configuration. Thus, the light source unit 60 can be provided in which the light shining area can be expanded so as to avoid the concentration of heat.

In addition, the reflecting surface is formed on the luminescent light emitting portion 103 of the luminescent wheel 101. Therefore, blue light which is shone on to the reflecting surface without being absorbed by the luminescent material is reflected by the reflecting surface and is then re-emitted towards the luminescent material side so as to excite the luminescent material. Thus, the utilization efficiency of blue light emitted from the first light sources 71 can be increased, thereby making it possible to emit brighter light. Further, green luminescent light emitted towards the base side from the green luminescent material can also be reflected by the reflecting surface so as to be emitted as light source light, and therefore, the utilization efficiency of luminescent light can also be increased. In addition, by adopting the metallic base having high thermal conductivity for the base of the luminescent wheel 101, the luminescent wheel 103 can be cooled with good efficiency.

The invention is not limited to the embodiment that has been described heretofore but can be modified or improved variously without departing from the spirit and scope thereof. For example, the respective area ratios of the luminescent light emitting portion 103 and the diffuse transmission portion 104 on the luminescent wheel 101 can freely be changed, thereby making it possible to set respective duty ratios of the colors arbitrarily.

When the luminous efficiency of a red luminous material is higher than that of a green luminous material, in place of forming the layer of the green luminous material thereon, a layer of a red luminous material can be formed on the luminous light emitting portion 103. As this occurs, laser emitters which emit laser beams of green wavelength band are adopted for the second light sources 121 in place of the laser emitters which emit laser beams of red wavelength band. Thus, the light source unit 60 can be provided which can emit highly luminous red, green and blue light. In addition, the light source unit 60 which is configured in the way described above can also emit light of wavelength bands of yellow and cyan which are complementary colors in addition to light of wavelength bands of red, green and blue which are the three primary colors of light.

The material for the base of the luminescent wheel 101 is not limited to metal. For example, the luminescent wheel 101 may be formed of a transparent base such as glass. As this occurs, as with light of blue wavelength band, light of green wavelength band is emitted from the luminescent wheel 101 in the direction of the front panel. In the optical layout shown in FIG. 4, the first dichroic mirror 141 is not disposed, and hence, the number of members in the light source unit 60 can be reduced, and the second dichroic mirror 148 is made to transmit light of blue and green wavelength bands and to reflect light of red wavelength band.

The optical layout of the light source unit 60 is not limited to that shown in FIG. 4, and hence, various forms can be adopted in accordance with layouts of light source devices. For example, in FIG. 4, the red light source device 120 is described as being located in the position where light source light emitted from the red light source device 120 is reflected by the reflecting mirror 124 to be incident on the collective lens 116. However, the red light source device 120 may be disposed so that light source light emitted therefrom can be directly incident on the collective lens 116 without disposing the reflecting mirror 124. In addition, in place of providing the light source control part in the projector 10, light source control parts may be provided for the individual light source devices in the light source unit 60.

The first light sources 71 are made up of the laser emitters which emit blue laser beams, and light from the first light sources 71 can be transmitted through the luminescent wheel 101 while being diffused for use as bright light source light as it is. However, the first light sources 71 are not limited to the laser emitters which emit laser beams of blue wavelength band but can adopt laser emitters which emit light of a wavelength band falling in the ultraviolet range (ultraviolet radiation). As this occurs, a luminescent light emitting portion 103 which is made up of a layer of a blue luminescent material and a layer of a green luminescent material and a diffuse transmission portion 104 are formed on the luminescent wheel 101. In addition, the light source control part is controlled so that no light is shone on to the diffuse transmission portion 104 from the ultraviolet laser emitters.

The light source unit 60 does not necessarily have to include the luminescent light emitting device 100 which includes, in turn, the circular disk-shaped rotatable luminescent plate (the luminescent wheel 101) as has been described above. For example, the light source unit 60 may include a luminescent light emitting device 100 which includes, in turn, a rectangular fixed luminescent plate. When the luminescent plate is fixed in this way, adjustor devices for changing shining directions of light emitted from the first light sources 71 and the second light sources 121 are disposed between the first light sources 71 and the second light sources 121 and the luminescent plate. Alternatively, light source driving devices are provided for changing the positions of the first light sources and the second light sources 121 or the light shining directions thereof so as to move shining spot positions of light from the first light sources 71 and the second light sources 121. Thus, luminous light and diffuse light can be emitted from the luminescent plate. As the adjustor device, for example, a polariscope can be adopted which employs KTN crystal, acoustic optical element, MEMS mirror or the like.

In addition, the invention is not limited to the embodiment that has been described above but can be modified variously in steps of carrying out the invention without departing from the spirit and scope thereof. Additionally, in carrying out the invention, the functions which are executed in the embodiment may be combined as required as much as possible. The embodiment includes various stages, and various inventions can be extracted by combining the plurality of disclosed constituent requirements as required. For example, when a required advantage can be obtained although some constituent requirements are deleted from the whole constituent requirements disclosed in the embodiment, the configuration which lacks the deleted constituent requirements can be extracted as an invention.

What is claimed is:

1. A light source unit comprising:
a luminescent plate having a luminescent light emission portion on which is formed a layer of a luminescent material which receives excitation light to emit luminous light and a diffuse transmission portion which transmits light in a diffusing fashion;
a first light source which emits light of a wavelength band which can excite the luminescent material;
a second light source which emits light of a wavelength band which differs from the luminous light emitted from the luminescent material and the light emitted from the first light source;
a light guiding optical system which guides light of respective wavelength bands in color emitted from the luminescent plate to a predetermined plane; and
a light source control part for controlling individually the emission of light from the first light source and the second light source, wherein
the luminescent plate is disposed on optical paths of the first light source and the second light source, and wherein a light shining position of light from the first light source and a light shining position of light from the second light source are made to differ from each other on the luminescent plate.

2. A light source unit according to claim 1, wherein
the light source control part executes a control in which the first light source and the second light source emit light simultaneously and a control in which the first light source and the second light source emit light separately.

3. A light source unit according to claim 1, wherein
the light source control part executes a control in which the first light source and the second light source emit light simultaneously so that luminous light which is emitted from the luminescent light emitting portion when it receives light from the first light source and light from the second light source which is transmitted through the diffuse transmission portion while being diffused are synthesized only for a predetermined period of time.

4. A light source unit according to claim 1, wherein
the luminescent plate is a luminescent wheel which is made up of a base which is driven to rotate by a wheel motor.

5. A light source unit according to claim 1, wherein
a reflecting surface which reflects light is formed on the luminescent light emitting portion, and a layer of a luminescent material which emits luminous light when it receives excitation light is formed on the reflecting surface.

6. A light source unit according to claim 1, wherein
the first light source is a laser emitter which emits light of a blue wavelength band.

7. A light source unit according to claim 6, wherein
the light source control part executes a control in which the first light source and the second light source emit light simultaneously so that light from the first light source which is transmitted through the diffuse transmission while being diffused and light from the second light source which is transmitted through the diffuse transmission portion while being diffused are synthesized only for a predetermined period of time.

8. A light source unit according to claim 6, wherein
the second light source is a laser emitter which emits light of a red wavelength band, and wherein
the luminescent material is a luminescent material which emits luminous light of a green wavelength band when it receives excitation light from the first light source.

9. A light source unit according to claim 8, wherein
the light source control part executes a control in which the first light source and the second light source emit light separately so as to include a period of time to emit light of red, green and blue wavelength bands separately.

10. A projector comprising:
the light source unit according to claim 9;
a display device;
a light source side optical system which collects light from the light source unit to the display device;
a projection side optical system which projects an image emitted from the display device on to a screen; and
a projector control unit for controlling the light source unit and the display device.

\* \* \* \* \*